Dec. 12, 1961   G. MANGERIAN   3,012,594
SCREW-HOLDING SCREW DRIVER ATTACHMENT
Filed Oct. 14, 1958
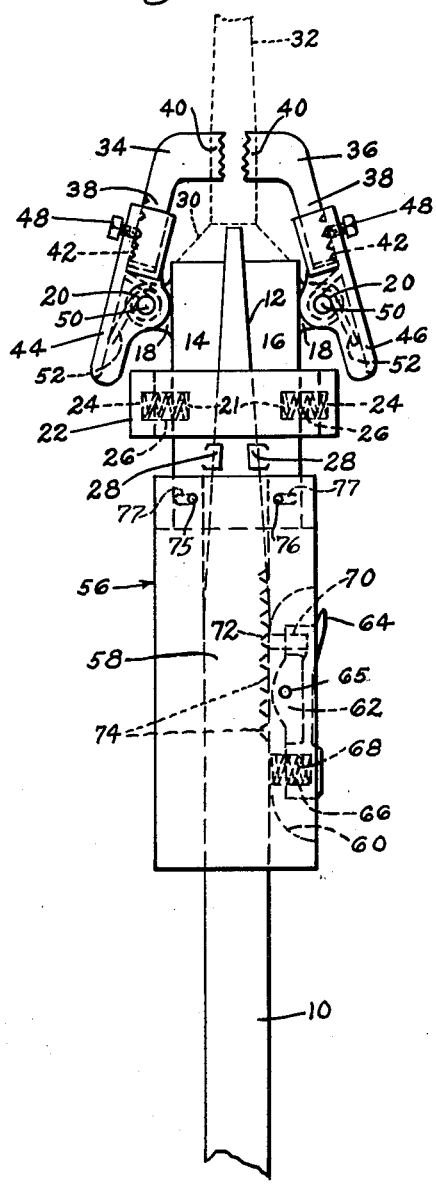
INVENTOR.
George Mangerian
BY Harold E. Cole
Attorney

United States Patent Office

3,012,594
Patented Dec. 12, 1961

3,012,594
SCREW-HOLDING SCREW DRIVER ATTACHMENT
George Mangerian, 76a Hancock St., Everett, Mass.
Filed Oct. 14, 1958, Ser. No. 767,138
1 Claim. (Cl. 145—52)

This invention relates to an attachment for screw drivers, especially developed for use when the screwing action is difficult or a perfectly straight penetration on the screw is desired.

One object of my invention is to provide bearing members slidable along a screw driver shank and onto the tool end thereof to bear against the head of a screw to thereby eliminate rocking movement of the screw driver and thus assure that pressure on the screw driver will be straight and true.

Another object is to provide grasping mechanism attached to said bearing members whereby a screw may be grasped just beyond the head and held prior to commencement of the screwing action.

Still another object is to provide locking mechanism slidable along the shank of a screw driver and which will hold said bearing members in predetermined position against the head of a screw until released.

A further object is to provide bearing members which, with the use of removable end members, enable said bearing members to fit over a round head of a screw or a flat head thereof.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claim.

In the drawings:

FIG. 1 is a side elevational view of my screw driver attachment in position of use on a screw driver, the latter being shown broken away, and a screw being shown in dash lines, broken away.

FIG. 2 is another side elevational view similar to FIG. 1; but taken at a right angle to the latter.

As illustrated, a shank 10 of a screw driver is shown, on which my screw driver attachment is movably mounted, the tool end of said shank having the usual tapered end portion 12.

A bearing assembly has two wedge-shaped bearing members 14 and 16, as shown, which are opposite each other and slidably contacting said shank. They preferably taper in thickness, the thinner part being the nearer to the inner or handle end of said shank. Each said bearing member 14 and 16, shown in said FIG. 1, has an ear 18 having a hole 20 therethrough and each bearing member has a recess 21 extending inwardly from the outside surface thereof. A collar 22 encircles said bearing members 14 and 16, having two recesses 24 extending from the inside surfaces inwardly into which, in each instance, a coil spring 26 enters, the other ends of said spring entering said bearing member recesses 21. This arrangement firmly retains said collar 22 around said bearing members since said coil springs 26 are compressed somewhat when in normal position, yet permitting said bearing members 14 and 16 to slide on said shank 10. Said bearing members each have two inwardly extending stop members 28 thereon which prevent any rocking action of the screw driver shank 10 during the screwing action.

When screwing action is to commence said bearing assembly is slid along said shank until it almost reaches the outside end of said shank tapered portion 12, in which position said bearing members 14 and 16 bear on the head 30 of a screw 32, as shown in said FIG. 1. This keeps the screw driver steady, preventing it from tipping, thus forcing the screw straight and true into the material it penetrates.

To grasp and hold a screw just under its said head, I provide grasping mechanism having two jaws 34 and 36 having arms 38 extending diagonally, and jaw portions 40 extending angularly therefrom towards each other which are serrated at their outside ends. Said jaws 34 and 36, which have notches 42 in their said arms 38, are attached to handles 44 and 46 respectively by screws 48 which extend through screw-threaded holes in said handles into said notches 42. Said handles 44 and 46 are rotatably attached to said bearing member ears 18 by pins 50. Well known tension springs 52 extend around said pins 50 and bear on said handles 44 and 46, hence said jaws normally are in pressure contact on a said screw. They may be opened or moved away from the screw, by pressing said handles inwardly.

I may provide locking mechanism 56 having an enclosure band 58 slidable on said screw driver shank 10, which band has a cut-out 60 at one side. The latter receives a locking member having a U-shaped body 62 with a finger knob 64 on one end. A pivot pin 65 pivotally attaches said body 62 to said enclosure band 58. Said body 62 has an opening 66 therein that receives a coil spring 68 which latter also bears on said screw driver shank 10 as shown in said FIG. 1. There is also another opening 70 in said body 62 into which an end of a tooth 72 is fitted while the opposite end extends into one of a number of notches 74 formed in said shank 10. Said coil spring 68 normally keeps said tooth 72 in a said notch 74, hence said locking band 58 thereby remains in a predetermined position, bearing on the head of a screw as shown in said FIG. 1. By forcing said finger knob 64 outwardly, or pressing on said body 62 opposite said spring 68, said tooth 72 may be freed from a said notch 74 and said locking mechanism 56 slid in either direction on said shank 10 to any position desired. Said enclosure band 58 is connected to said bearing members 14 and 16 by pins 75 and 76 respectively. Said bearing members 14 and 16 have elongate slots 77 to permit sliding action of said bearing members within said band 58.

What I claim is:

A screw driver attachment comprising two bearing members slidable along the shank of a screw driver and normally spaced apart in position of use, means holding said members in slidable association with said shank when spaced apart, and screw grasping mechanism embodying two handles each having a socket at one end, two jaws, each having a portion received in the socket of one of the handles, screw means adjustably extending through the handles and engaging the jaw portions to hold the handles and jaws in relatively adjusted positions, pin members pivotally holding said handles to said bearing members and spring members extending around said pin members and bearing on said handles to bias said jaws normally in a grasping position.

References Cited in the file of this patent
UNITED STATES PATENTS

| | | |
|---|---|---|
| 277,599 | Nei | May 15, 1883 |
| 280,845 | McLellan | July 10, 1883 |
| 290,218 | Drake | Dec. 18, 1883 |
| 1,231,792 | Royer | July 3, 1917 |
| 1,240,138 | Haufe | Sept. 11, 1917 |
| 1,726,693 | Clementson | Sept. 3, 1929 |
| 2,688,991 | Doyle | Sept. 14, 1954 |
| 2,817,377 | Cate et al. | Dec. 24, 1957 |